US012649460B2

(12) United States Patent
Iida et al.

(10) Patent No.: US 12,649,460 B2
(45) Date of Patent: Jun. 9, 2026

(54) PARKING ASSISTANCE METHOD AND PARKING ASSISTANCE DEVICE

(71) Applicant: Panasonic Automotive Systems Co., Ltd., Kanagawa (JP)

(72) Inventors: Takuma Iida, Kanagawa Ken (JP); Shota Akaura, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 16 days.

(21) Appl. No.: 18/819,253

(22) Filed: Aug. 29, 2024

(65) Prior Publication Data

US 2024/0416895 A1 Dec. 19, 2024

Related U.S. Application Data

(63) Continuation of application No. PCT/JP2022/045574, filed on Dec. 9, 2022.

(30) Foreign Application Priority Data

Mar. 25, 2022 (JP) ................................. 2022-049339

(51) Int. Cl.
*B60W 30/06* (2006.01)
*B60W 50/00* (2006.01)

(52) U.S. Cl.
CPC ..... *B60W 30/06* (2013.01); *B60W 2050/0005* (2013.01)

(58) Field of Classification Search
CPC . B60W 30/06; B60W 2050/0005; B62D 1/00; B62D 15/0285
See application file for complete search history.

(56) References Cited

U.S. PATENT DOCUMENTS 9,140,553 B2 9/2015 Grimm et al.
12,099,357 B1 * 9/2024 Ebrahimi Afrouzi ......................
G05D 1/0214

(Continued)

FOREIGN PATENT DOCUMENTS

CN 112265541 1/2021
JP 2009-292254 12/2009

(Continued)

OTHER PUBLICATIONS

Okuyama Mio et al., Jun. 17, 2015, English Machine Translation_ JP2017007399A provided by Patent Translate by EPO and Google (Year: 2015).*

(Continued)

*Primary Examiner* — Ashley L Redhead, Jr.
(74) *Attorney, Agent, or Firm* — Greenblum & Bernstein, P.L.C.

(57) ABSTRACT

A parking assistance method according to the present disclosure is a method for performing automated traveling of a vehicle based on teacher traveling by a user. The method includes: causing a memory to store information on a travel path in teacher traveling; controlling the vehicle based on the stored travel path; detecting an obstacle during controlling the vehicle; determining whether an avoiding path for avoiding the obstacle is able to be generated; and notifying, when the avoiding path is not able to be generated, a communication terminal of the user not to be able to generate the avoiding path. Furthermore, the controlling is executed based on an instruction for automated traveling from the communication terminal.

14 Claims, 4 Drawing Sheets

(56) References Cited

U.S. PATENT DOCUMENTS

| | | | | |
|---|---|---|---|---|
| 2009/0309970 | A1 | 12/2009 | Ishii et al. | |
| 2013/0085637 | A1 | 4/2013 | Grimm et al. | |
| 2018/0308359 | A1* | 10/2018 | Hayakawa | G08G 1/145 |
| 2020/0269833 | A1* | 8/2020 | Hayakawa | G05D 1/02 |
| 2020/0312051 | A1 | 10/2020 | Nishikawa | |
| 2020/0339195 | A1* | 10/2020 | Feijoo | B62D 15/0285 |
| 2021/0080967 | A1* | 3/2021 | Pettinger | B60W 30/10 |
| 2021/0107563 | A1* | 4/2021 | Minase | G08G 1/147 |
| 2021/0253134 | A1 | 8/2021 | Heimberger et al. | |
| 2021/0284139 | A1* | 9/2021 | Takeuchi | H04W 4/44 |
| 2021/0380097 | A1 | 12/2021 | Tokuhiro | |
| 2022/0041163 | A1* | 2/2022 | Lynn | B60W 30/182 |
| 2022/0073101 | A1* | 3/2022 | Wang | B62D 15/0285 |
| 2022/0089181 | A1* | 3/2022 | Gross | G07C 5/0841 |
| 2022/0327333 | A1* | 10/2022 | Csorgo | G06N 20/00 |
| 2023/0138112 | A1* | 5/2023 | Gross | G05D 1/0027 |
| | | | | 701/24 |
| 2023/0182718 | A1 | 6/2023 | Tokuhiro | |
| 2024/0075921 | A1* | 3/2024 | Paula | B60W 50/14 |

FOREIGN PATENT DOCUMENTS

| | | | | | |
|---|---|---|---|---|---|
| JP | | 2013-530867 | 8/2013 | | |
| JP | | 2013530867 | A * 8/2013 | | B60W 30/06 |
| JP | | 6022447 | 11/2016 | | |
| JP | | 2017-007399 | 1/2017 | | |
| JP | | 2017007399 | A * 1/2017 | | |
| JP | | 2017-165145 | 9/2017 | | |
| JP | | 2017165145 | A * 9/2017 | | |
| JP | | 2020-161010 | 10/2020 | | |
| JP | | 2020161010 | A * 10/2020 | | B60R 25/241 |
| JP | | 2021-163114 | 10/2021 | | |
| JP | | 2021-191658 | 12/2021 | | |
| WO | | 2006/064544 | 6/2006 | | |

OTHER PUBLICATIONS

Shibata Shuhei et al., Mar. 14, 2016, English Machine Translation_ JP2017165145 A provided by Patent Translate by EPO and Google (Year: 2016).*

Japanese Reference 2, Jun. 9, 2010, English Machine Translation_ JP2013530867A provided by Patent Translate by EPO and Google (Year: 2010).*

Nishikawa Yushi, Mar. 28, 2019, English Machine Translation_ JP2020161010A provided by Patent Translate by EPO and Google (Year: 2019).*

International Search Report (ISR) from International Searching Authority (Japan Patent Office) in International Pat. Appl. No. PCT/JP2022/045574, dated Feb. 21, 2023, together with an English language translation.

Office Action from Japan Patent Office (JPO) in Japanese Patent Appl. No. 2022-049339, dated Nov. 4, 2025, together with an English language translation.

* cited by examiner

PARKING ASSISTANCE METHOD AND PARKING ASSISTANCE DEVICE

CROSS-REFERENCE TO RELATED APPLICATIONS

This application is a continuation of International Application No. PCT/JP2022/045574, filed on Dec. 9, 2022, which claims the benefit of priority from Japanese Patent Application No. 2022-049339, filed on Mar. 25, 2022, the entire contents of which are incorporated herein by reference.

FIELD

Embodiments described herein relate generally to a parking assistance method and a parking assistance device.

BACKGROUND

Conventionally, a parking assistance technique for moving a vehicle by automated driving when parking the vehicle is known (e.g., see Japanese Patent No. 6022447).

SUMMARY

A parking assistance method according to an embodiment of the present disclosure, for performing automated traveling of a vehicle based on teacher traveling by a user, includes: causing a memory to store information on a travel path in the teacher traveling; controlling the vehicle based on the stored travel path; detecting an obstacle during controlling the vehicle; determining whether an avoiding path for avoiding the obstacle is able to be generated; and notifying, when the avoiding path is not able to be generated, a communication terminal of the user not to be able to generate the avoiding path. The controlling is executed based on an instruction for automated traveling from the communication terminal.

DETAILED DESCRIPTION

Preferred embodiments relating to a method according to the present disclosure and an advantage thereof are equally applicable to a parking assistance device according to the present disclosure and also to a car according to the present disclosure.

Further features of the present disclosure will become apparent from claims, drawings, and description of the drawings. All features and combinations of the features in the description above and in description of drawings below, and/or features illustrated in only the drawings and combinations thereof, can not only be implemented each, but can also be used in combination with others or on their own.

In the following, preferred embodiments of the present disclosure will be described in detail with reference to the accompanying drawings.

As a use scene of a parking assistance system including a parking assistance device of the present embodiment, there is exemplified a scene where when a vehicle is parked in a home parking lot, the vehicle automatically executes parking after a user gets off the vehicle.

In this scene, after getting off at a predetermined position in the parking lot, the user instructs the vehicle to execute automated parking via a communication terminal of the user. When the instruction is completed, the user enters a house, and the vehicle executes the automated parking toward a parking position. However, when an unavoidable obstacle is present on a parking path while the vehicle is executing the automated parking, the vehicle interrupts the automated parking and stops. Furthermore, since the user is in the house, there is a problem that it is difficult to recognize a situation where the vehicle interrupts the automated parking and stops.

First Embodiment

"Configuration of Parking Assistance System 1"

Figure 1:
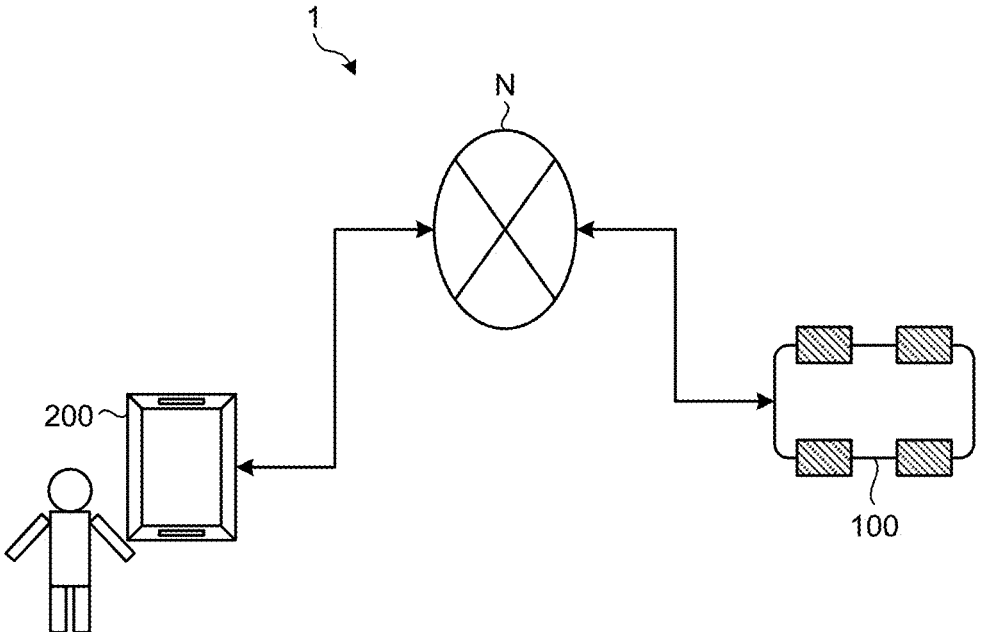
FIG. 1 is a diagram illustrating an example of a network configuration of a parking assistance system according to a first embodiment.

FIG. 1 is a diagram illustrating an example of a network N configuration of a parking assistance system 1 according to a first embodiment. As illustrated in FIG. 1, the parking assistance system 1 according to the first embodiment includes a vehicle 100 and a communication terminal 200. The vehicle 100 and the communication terminal 200 are connected to each other by the network N. The network N includes a public network such as the Internet, a wireless network of a mobile phone network, a dedicated network such as VPN (Virtual Private Network), and a network such as LAN (Local Area Network).

"Configuration of Vehicle 100"

The vehicle 100 includes a vehicle body and two pairs of wheels arranged along a predetermined direction on the vehicle body. The two pairs of wheels include a pair of front tires and a pair of rear tires.

The front tire is an example of a first wheel in the present embodiment. The rear tire is an example of a second wheel in the present embodiment. Note that although the vehicle 100 includes four wheels, the number of wheels is not limited thereto. For example, the vehicle 100 may be a two-wheeled vehicle.

The vehicle body is coupled to the wheels and is movable by the wheels. In this case, the predetermined direction in which the two pairs of wheels are arranged is a traveling direction (moving direction) of the vehicle 100. The vehicle 100 can move forward or backward by gear shift or the like. The vehicle 100 can also turn right or left by steering.

A wave transmitter/receiver 110 (see FIG. 2) that transmits and receives a sound wave such as an ultrasonic wave is arranged at a predetermined end of the vehicle body. For example, one or more wave transmitter/receivers 110 are arranged on a front bumper, and one or more wave transmitter/receivers 110 are arranged on a rear bumper. Hereinafter, in a case where the wave transmitter/receiver 110 arranged on the front bumper and the wave transmitter/receiver 110 arranged on the rear bumper are not particularly limited, they are simply referred to as the wave transmitter/receiver 110. In addition, the vehicle 100 includes an imaging device 120, a steering actuator 130, an engine actuator 140, a brake actuator 150, and a parking assistance device 160 (see FIG. 2).

The wave transmitter/receiver 110 is, for example, a distance measuring sensor. The distance measuring sensor is, for example, an ultrasonic sonar. For example, when the vehicle 100 is traveling in a parking lot, the ultrasonic sonar radiates an ultrasonic wave, and detects a distance to an obstacle present around the vehicle 100 on the basis of a reflected wave detected as a result of reflection. Then, the ultrasonic sonar calculates a contour point of the obstacle on the basis of the distance to the obstacle, and detects a feature point of the obstacle on the basis of the contour point. Note that the distance measuring sensor is not limited to an ultrasonic sensor, and may be, for example, a millimeter wave radar, or LiDAR (Light Detection and Ranging, Laser Imaging Detection and Ranging).

The imaging device 120 is, for example, a visible light camera. The vehicle 100 includes a first imaging device that images the front of the vehicle 100, a second imaging device that images the rear of the vehicle 100, a third imaging device that images a left side of the vehicle 100, and a fourth imaging device that images a right side of the vehicle 100. Hereinafter, in a case where the first imaging device, the second imaging device, the third imaging device, and the fourth imaging device are not particularly distinguished, they are simply referred to as the imaging devices 120. Furthermore, although details will be described later, the imaging device 120 is applied to a use for detecting a feature point of an object present around the vehicle 100 and estimating a current position of the vehicle 100 from a positional relationship between the vehicle 100 and the feature point, for example. The imaging device 120 outputs a captured image signal to the parking assistance device 160. Note that the imaging device 120 is not limited to the visible light camera, and may be, for example, a CCD camera or a CMOS camera. Note that the image to be captured may be a still image or a moving image. Furthermore, the imaging device 120 may be a camera built in the vehicle 100, a camera of a drive recorder retrofitted to the vehicle 100, or the like. Note that, as a sensor for estimating the current position of the vehicle 100, an ultrasonic sensor, LiDAR, radar, or the like as a distance measuring sensor may be used instead of the imaging device 120.

The steering actuator 130 adjusts a steering angle of the vehicle 100 on the basis of an output of the parking assistance device 160 to be described later. The parking assistance device 160 controls the steering angle by transmitting a target steering angle to the steering actuator 130. The parking assistance device 160 controls a turning curvature during traveling of the vehicle 100 by controlling the steering actuator 130. The engine actuator 140 adjusts a supply amount of fuel and air to an engine on the basis of the output of the parking assistance device 160. The brake actuator 150 adjusts a braking force of the wheel on the basis of the output of the parking assistance device 160.

The parking assistance device 160 is mounted on the vehicle 100. The parking assistance device 160 is an information processing device that can be mounted on a vehicle, and is, for example, ECU (Electronic Control Unit) or OBU (On-Board Unit) provided inside the vehicle 100. Alternatively, the parking assistance device 160 may be an external device installed near a dashboard of the vehicle 100. Note that the parking assistance device 160 may also serve as a car navigation device or the like.

Figure 2:
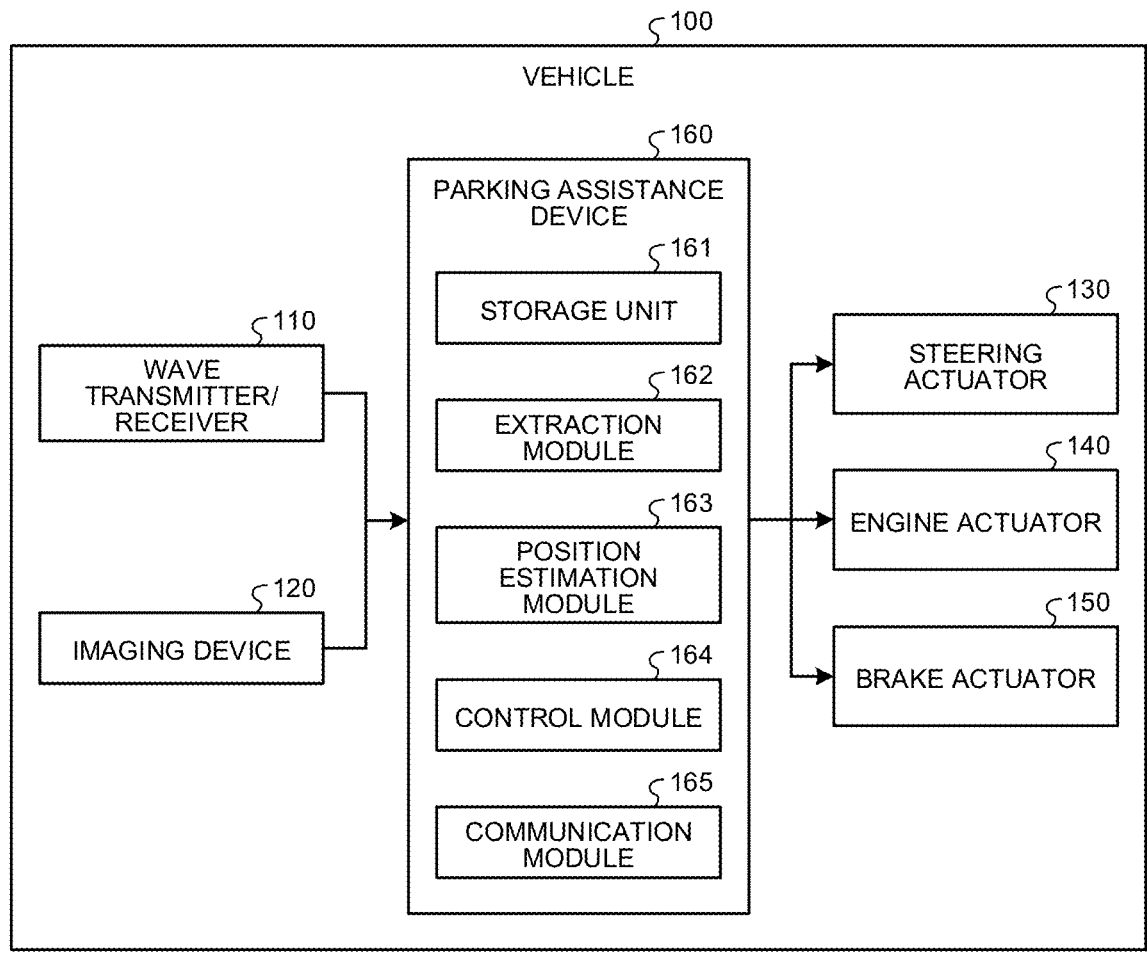
FIG. 2 is a block diagram illustrating functions of a parking assistance device according to the first embodiment.

FIG. 2 is a block diagram illustrating functions of the parking assistance device 160 provided in the vehicle 100 according to the first embodiment. As illustrated in FIG. 2, the parking assistance device 160 of the first embodiment includes a storage unit 161, an extraction module 162, a position estimation module 163, a control module 164, and a communication module 165.

The storage unit 161 stores travel information obtained when the vehicle 100 is parked in a parking space from a parking start position by a driver of the vehicle 100. More specifically, the storage unit 161 stores travel information obtained when the vehicle 100 is parked in the parking space from the parking start position. Note that traveling in which the driver moves the vehicle 100 from the parking start position to the parking space by manual driving is also referred to as teacher traveling. In addition, travel information at the time of teacher traveling is also referred to as teacher data. The teacher data includes information on a target parking position of the parking space at the time of teacher traveling, a speed at the time of teacher traveling, a steering angle at the time of teacher traveling, a braking operation at the time of teacher traveling, and a travel path at the time of teacher traveling (hereinafter, also referred to as a teacher path), and feature point information extracted from a surrounding image of the parking space captured during teacher traveling. Here, the information regarding the travel path at the time of teacher traveling includes information such as position coordinates on a path, a path length, a minimum turning radius, and a steering wheel turn-back position. Note that the teacher traveling is not limited to backward traveling, and may include forward traveling or both forward traveling and backward traveling.

In addition, a teacher path in which the driver moves the vehicle backward to enter a garage (parking space) can be used as a teacher path at the time of exiting the garage by reversely following the path from the garage.

The extraction module 162 extracts feature points from a surrounding image captured by the imaging device 120. A method of extracting a feature point by the extraction module 162 is not particularly limited, and a known method may be applied. For example, the extraction module 162 extracts feature points by a method such as FAST (Features from Accelerated Segment Test) or ORB (Oriented FAST and Rotated BRIEF).

The position estimation module 163 receives the feature point extracted by the extraction module 162 and the feature point stored in the teacher data stored in the storage unit 161. The position estimation module 163 collates the feature point extracted from the captured image which has been captured by the imaging device 120 with the feature point stored in the teacher data using pattern matching, feature value search, or the like. Then, among the feature points that are extracted from the captured image and that can be collated with the feature points stored in the teacher data, the position estimation module 163 randomly selects several feature points and estimates the current position of the vehicle 100 on the basis of positions of these several feature points in a camera image and three-dimensional positions of the several feature points in a real space.

The control module 164 controls the engine actuator 140, the brake actuator 150, and the steering actuator 130. In other words, the control module 164 can control the vehicle 100 by controlling steering, braking, and acceleration/deceleration of the vehicle 100. Furthermore, the control module 164 executes automated traveling (storage-type automated parking) using current position information and the teacher data on the basis of an instruction from the communication terminal 200. As an example, when receiving a parking instruction from the communication terminal 200 via the communication module 165, the control module 164 performs control to cause the vehicle 100 to move from the parking start position to the parking space on the basis of the teacher data. Note that the control module 164 may transmit garage entering completion information, which is a notification that movement of the vehicle 100 from the parking start position to the parking space has been completed, to the communication terminal 200 via the communication module 165 to be described later.

As described above, in the present embodiment, the storage-type automated parking is applied to entering of the vehicle into the parking space from the parking start position or exiting of the vehicle from the parking space to the parking start position.

When the vehicle 100 deviates from the teacher path, the control module 164 causes the vehicle 100 to move so as to return to the travel path by feedback control. For example, the control module 164 estimates a difference between a position of the vehicle 100 and the teacher path on the basis of the current position of the vehicle 100 estimated by the position estimation module 163, and causes the vehicle 100 to travel so as to reduce the difference. The reason for performing the feedback control is that there is a case where the position of the vehicle 100 when the storage-type automated parking is started does not coincide with an initial position of the teacher path. Furthermore, the control module 164 may change the teacher path of the vehicle 100 on the basis of the teacher data.

When an obstacle is detected by the wave transmitter/receiver 110, the imaging device 120, another in-vehicle sensor, or the like during parking control, the control module 164 may correct the travel path so as to include an avoiding path for avoiding the detected obstacle. Here, as an example, the avoiding path need only be a path that bypasses an obstacle from the vicinity of the obstacle and joins the traveling path again. Note that an existing method may be used for path generation of the avoiding path. Examples of the obstacle include a bicycle, playground equipment, and a living thing. Note that, in this case, the user may be notified that although the obstacle has been detected, automated parking has been continued while avoiding the obstacle.

In a case where an avoiding path for avoiding a detected obstacle cannot be generated, the control module 164 causes the vehicle 100 to stop and transmits a signal to the communication terminal 200 via the communication module 165 to be described later. Here, examples of the case where an avoiding path cannot be generated include a case where when the vehicle travels while avoiding the obstacle, the vehicle collides with a wall. In other words, in a case where there is no space where the vehicle 100 can travel outside the teacher path, such as a parking lot where an outside of a parking space or the teacher path is surrounded by walls, trees, and the like, the control module 164 need only determine that the avoiding path cannot be generated. As a means for determining whether or not there is a space where the vehicle 100 can travel, an existing method of calculating a distance to the wall using a distance measuring sensor or the like may be used. In addition, in a case where a distance between the vehicle 100 and an obstacle outside the teacher path when the vehicle travels on the avoiding path is less than a predetermined distance (e.g., 30 cm), the control module 164 may determine that the avoiding path cannot be generated. Furthermore, as another example, when an obstacle is present in the parking space, parking cannot be completed, and thus the control module 164 may determine that a path that allows parking in the parking space cannot be generated.

In a case where the avoiding path cannot be generated or a path that allows parking in the parking space cannot be generated, the control module 164 notifies the user to remove the obstacle. For example, the control module 164 communicates with the communication terminal 200 of the user via the communication module 165, and gives a notification of a message like "An object that cannot be avoided has been detected during execution of automated parking. Please remove the object." by transmission. Note that the message may be displayed on a display of the communication terminal 200 or may be read aloud.

The communication module 165 communicates with the communication terminal 200 and receives an instruction to execute the automated parking from the communication terminal 200. Furthermore, the communication module 165 transmits, to the communication terminal 200, information indicating that the vehicle 100 has stopped during execution of the automated parking or that an obstacle is present in the vicinity of the vehicle 100.

"Configuration of Communication Terminal 200"

The communication terminal 200 is a communication terminal used by a user. Examples of the communication terminal 200 include a smartphone and a tablet terminal. The communication terminal 200 communicates with the vehicle 100 via a network N. Furthermore, the communication terminal 200 displays an automated parking system related to the vehicle 100. By operating the communication terminal 200, the user can remotely operate the vehicle 100 even after getting off the vehicle 100. In other words, the user can instruct on execution of the automated parking from the outside of the vehicle 100 by operating the communication terminal 200.

Figure 3:
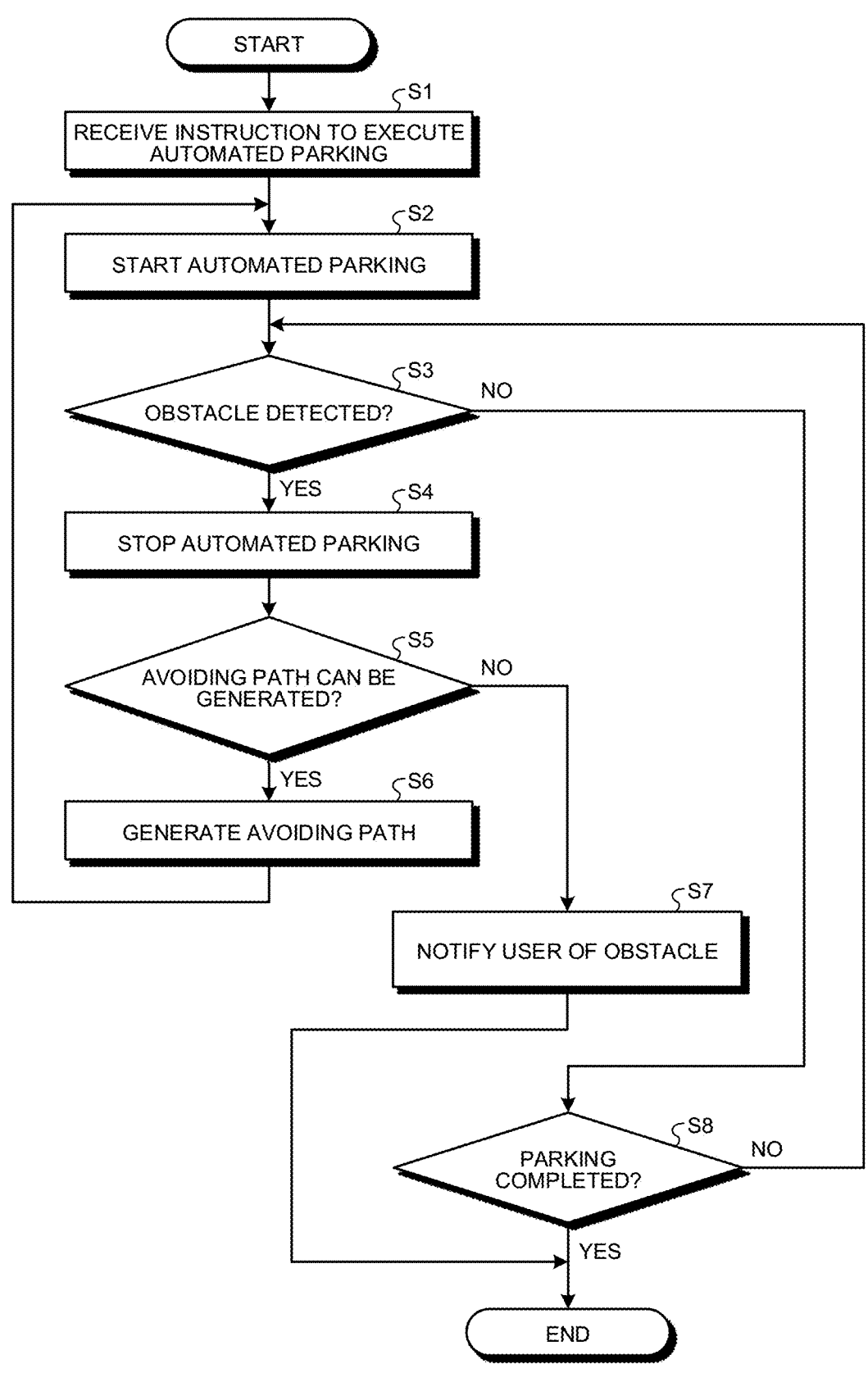
FIG. 3 is a flowchart illustrating an example of processing executed by the parking assistance device according to the first embodiment.

Next, processing executed by the parking assistance device 160 according to the present embodiment will be described. FIG. 3 is a flowchart illustrating an example of the processing executed by the parking assistance device 160 according to the present embodiment.

First, the control module 164 receives an instruction to execute the automated parking (Step S1). Specifically, the control module 164 receives the instruction to execute the automated parking from the user via the communication terminal 200.

Next, the control module 164 starts automated parking control (Step S2). Specifically, the control module 164 controls the vehicle 100 so that the vehicle 100 moves from the current position of the vehicle 100, which is the parking start position, to the parking space on the basis of the teacher data.

Next, during the execution of the automated parking, the control module 164 continuously detects whether or not an obstacle is present around the vehicle 100 (Step S3). Specifically, the control module 164 detects whether or not an obstacle is present around the vehicle 100 on the basis of sensor data of the wave transmitter/receiver 110 or a captured image which is captured by the imaging device 120.

When an obstacle is detected (Step S3: Yes), the control module 164 stops the automated parking (Step S4). Next, the control module 164 determines whether or not the avoiding path can be generated (Step S5). For example, the control module 164 generates a path that is a candidate for the avoiding path, and determines whether or not the avoiding path can be generated on the basis of whether or not a distance between the vehicle 100 and an obstacle outside the teacher path when the vehicle travels on the generated path is less than the predetermined distance.

When determining that the avoiding path cannot be generated (Step S5: No), the control module 164 notifies the user to remove the object (Step S7). For example, the control module 164 transmits a message prompting the user to remove the object to the communication terminal 200 of the user, and ends this processing.

On the other hand, when it is determined in Step S5 that the avoiding path can be generated (Step S5: Yes), the control module 164 generates the avoiding path for avoiding the obstacle (Step S6). Then, the control module 164 returns to the processing of Step S2 and restarts the automated parking control.

When no obstacle is detected in Step S3 (Step S3: No), the control module 164 checks whether parking of the vehicle 100 is completed or not (Step S8). Specifically, the control module 164 determines whether the vehicle 100 has been parked in the parking space or not on the basis of the sensor data of the wave transmitter/receiver 110 or the captured image which is captured by the imaging device 120.

When the parking of the vehicle 100 is completed (Step S8: Yes), the control module 164 ends this processing. On the other hand, when the parking of the vehicle 100 is not completed (Step S8: No), the automated parking control is continued to return to the processing of Step S3.

According to the parking assistance system 1 of the present embodiment, even in a case where the user enters the house, and an unavoidable obstacle is present on the parking path while the vehicle 100 is executing the automated traveling (storage-type automated parking), and the vehicle 100 interrupts the automated parking and stops, the user can recognize a situation where the vehicle 100 interrupts the automated parking and stops. Therefore, the user can recognize the situation where the obstacle is present at an early stage, and can remove the obstacle. In addition, the removal of the obstacle allows the vehicle 100 to resume the automated traveling (storage-type automated parking) and complete the parking.

Other Embodiment

Figure 4:
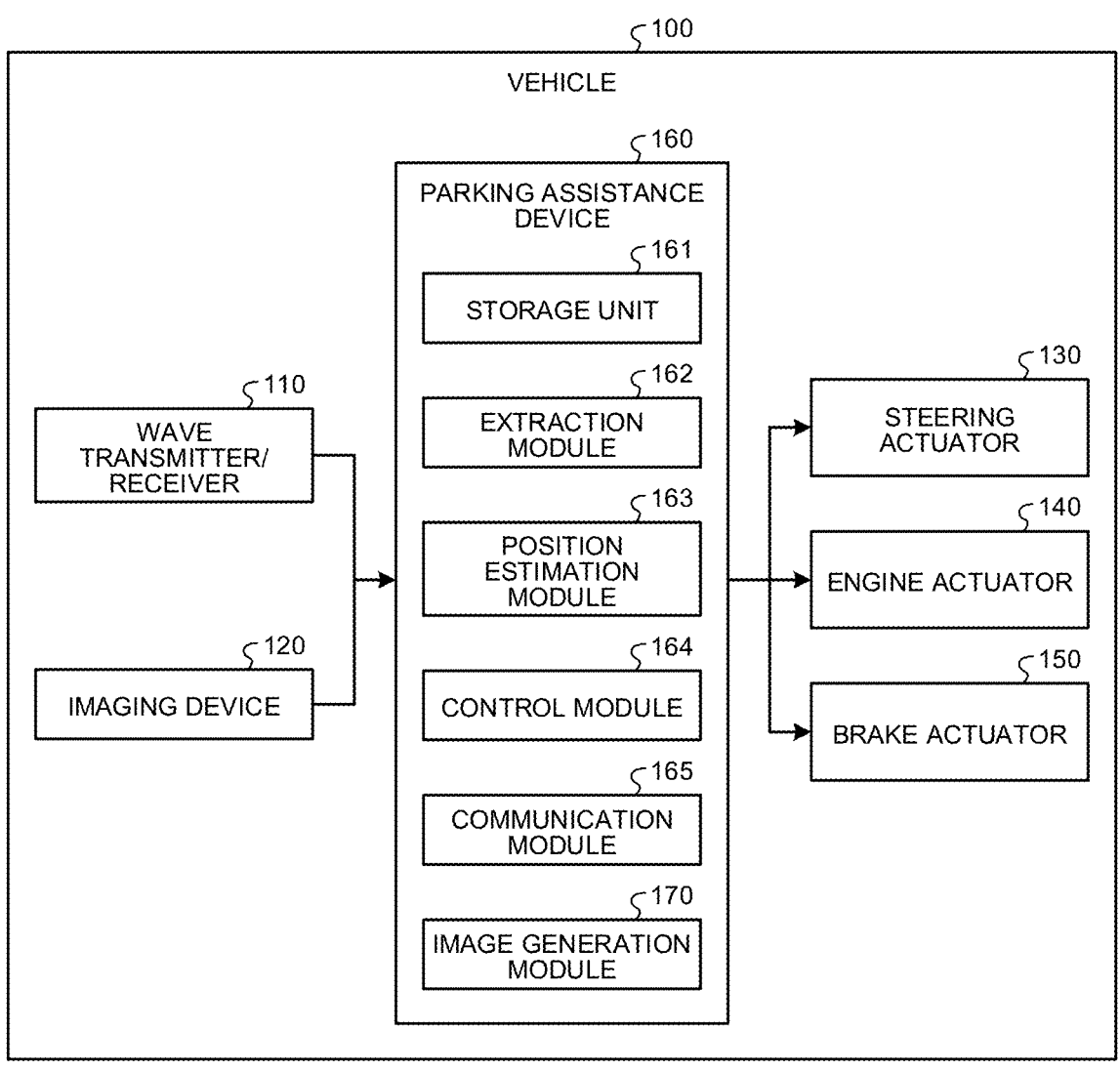
FIG. 4 is a block diagram illustrating functions of a parking assistance device according to another embodiment.

The parking assistance device 160 may further include an image generation module 170. FIG. 4 is a block diagram illustrating functions of the parking assistance device 160 provided in the vehicle 100 according to other embodiment. The image generation module 170 generates an image to be displayed on a display device. The image generation module 170 combines infinite points of a left side image, a right side image, a rear image, and a front image captured by the imaging device 120 into one infinite point, performs viewpoint transformation on four images as viewed from one virtual viewpoint, and then combines the transformed four images to generate one composite image. The image generation module 170 outputs the generated composite image to the communication terminal 200 of the user via the communication module 165. Furthermore, the image generation module 170 is not limited to a composite image, and may output a captured image which is captured by a single imaging device 120 to the communication terminal 200 of the user.

After notifying the user to remove the obstacle, the control module 164 may continuously determine whether or not the object has been removed from the surroundings of the vehicle 100 on the basis of the captured image which is captured by the imaging device 120. The control module 164 may also determine whether or not the obstacle has been removed upon reception of an input indicating that the obstacle has been removed from the user. Furthermore, in a case where it is detected that the obstacle has been removed, the control module 164 resumes the automated parking. On the other hand, in a case where removal of the obstacle cannot be detected even after a predetermined time has elapsed, the user may be notified again.

The control module 164 may cooperate with a management system that comprehensively manages home electric appliances and residential facilities via the communication module 165. In this case, the user may be notified by displaying, on a television set, a message prompting the user to remove an obstacle, or by uttering sound prompting the user to remove the object from a speaker. Furthermore, the control module 164 may cooperate with AR glasses worn by the user via the communication module 165. In this case, a message prompting removal of the obstacle may be displayed on the AR glasses. In addition, the control module 164 may cooperate with a hearing aid worn by the user via the communication module 165. In that case, a notification may be given to the user by uttering sound that prompts the user to remove the object from the hearing aid.

In a case where a small animal suddenly jumps out during the automated parking of the vehicle 100, or the like, there is a possibility that steering wheel operation or braking operation by the control module 164 might not be performed in time. Therefore, there is a possibility that the vehicle 100 comes into contact with a living thing popping out.

Therefore, the control module 164 may detect contact between the vehicle 100 and a living thing on the basis of information of sensor data of the wave transmitter/receiver 110, the imaging device 120, other sensor (e.g., a pressure sensor), or the like, and upon detection of the contact, immediately notify the user that the contact has been detected. As a result, when the vehicle 100 and the living thing come into contact with each other, the user can promptly start an action to check the vehicle 100 and a surrounding situation thereof.

Furthermore, for example, when detecting that a subject coming in contact with the vehicle 100 is a person on the basis of information of sensor data of the imaging device 120 or the like, the control module 164 may transmit a notification indicating that the vehicle 100 has come into contact with a person to a server device or the like of a company that provides an emergency call service for giving a notification to a police department, a fire department, or the like, in addition to a notification to the user. As a result, when a minor collision between the vehicle 100 and a person occurs, it is possible to promptly start an action for rescuing a victim.

Although some embodiments of the present invention have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and are included in the equivalent scope thereof.

What is claimed is:

1. A parking assistance method for performing automated traveling of a vehicle based on teacher traveling by a user, the parking assistance method comprising:

causing a memory to store information on a teacher path to a parking space in the teacher traveling;

estimating a current position of the vehicle;

communicating with a communication terminal of the user;

receiving an instruction for automated traveling from the communication terminal after the teacher traveling and after the user exits the vehicle;

controlling the vehicle based on the current position of the vehicle and the teacher path when the instruction for the automated traveling is received from the communication terminal;

controlling the vehicle to return to the teacher path when the current position of the vehicle deviates from the teacher path;

detecting an obstacle during the automated traveling;

generating an avoiding path during the automated traveling, the avoiding path bypassing the obstacle in the teacher path and joining the teacher path again;

notifying the user that the obstacle is present when the obstacle is on the teacher path and there is no space where the vehicle can travel outside the teacher path;

generating the avoiding path when the obstacle is on the teacher path and there is the space where the vehicle can travel outside the teacher path, the avoiding path allowing a distance between the vehicle and the obstacle to be a predetermined distance or more; and notifying the user that the obstacle is present when the obstacle is in the parking space in the teacher traveling.

2. The parking assistance method according to claim 1, wherein the predetermined distance is 30 cm.

3. The parking assistance method according to claim 1, further comprising:

resuming the automated traveling when the obstacle is removed.

4. The parking assistance method according to claim 3, wherein the communication terminal includes a smartphone or a tablet terminal.

5. The parking assistance method according to claim 1, further comprising:

displaying, on a display, a message prompting the user to remove the obstacle, the display being in a home of the user and connected to a management system that comprehensively controls home electric appliances.

6. The parking assistance method according to claim 1, further comprising:

notifying the user that the vehicle has stopped during execution of the automated parking.

7. The parking assistance method according to claim 1, further comprising:

generating a composite image by combining a left side image of the vehicle, a right side image of the vehicle, a rear image of the vehicle, and a front image of the vehicle.

8. A parking assistance device that performs automated traveling of a vehicle based on teacher traveling by a user, the parking assistance device comprising:

a memory configured to store information on a teacher path to a parking space in the teacher traveling; and a processor connected to the memory and configured to cause the memory to store the information on the teacher path to the parking space in the teacher traveling, estimate a current position of the vehicle, communicate with a communication terminal of the user, receive an instruction for automated traveling from the communication terminal after the teacher traveling and after the user exits the vehicle, control the vehicle based on the current position of the vehicle and the teacher path when the instruction for the automated traveling is received from the communication terminal, control the vehicle to return to the teacher path when the current position of the vehicle deviates from the teacher path, detect an obstacle during the automated traveling, generate an avoiding path during the automated traveling, the avoiding path bypassing the obstacle in the teacher path and joining the teacher path again, notify the user that the obstacle is present when the obstacle is on the teacher path and there is no space where the vehicle can travel outside the teacher path, generate the avoiding path when the obstacle is on the teacher path and there is the space where the vehicle can travel outside the teacher path, the avoiding path allowing a distance between the vehicle and the obstacle to be a predetermined distance or more, and notify the user that the obstacle is present when the obstacle is in the parking space in the teacher traveling.

9. The parking assistance device according to claim 8, wherein the predetermined distance is 30 cm.

10. The parking assistance device according to claim 8, wherein the processor is further configured to resume the automated traveling when the obstacle is removed.

11. The parking assistance device according to claim 8, wherein the communication terminal includes a smartphone or a tablet terminal.

12. The parking assistance device according to claim 8, wherein the processor is further configured to display, on a display, a message prompting the user to remove the obstacle, the display being in a home of the user and connected to a management system that comprehensively controls home electric appliances.

13. The parking assistance device according to claim 8, wherein the processor is further configured to notify the user that the vehicle has stopped during execution of the automated parking.

14. The parking assistance device according to claim 8, wherein the processor is further configured to generate a composite image by combining a left side image of the vehicle, a right side image of the vehicle, a rear image of the vehicle, and a front image of the vehicle.

* * * * *